(No Model.)
T. B. SORENSON.
COMBINED COAL SHOVEL AND ASH SIFTER.
No. 571,205. Patented Nov. 10, 1896.
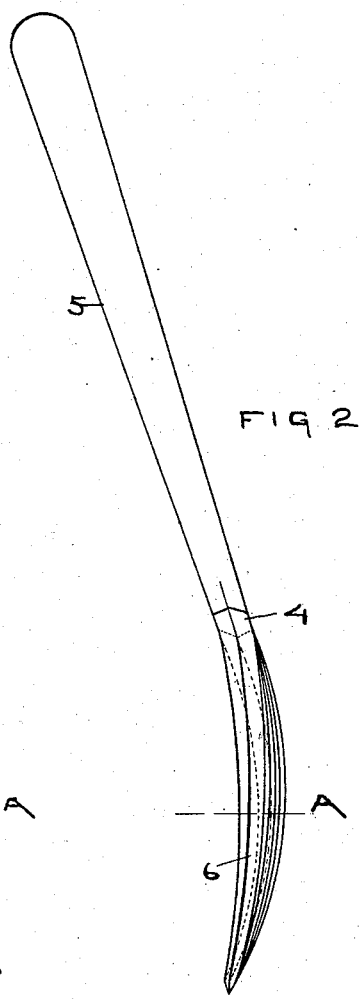
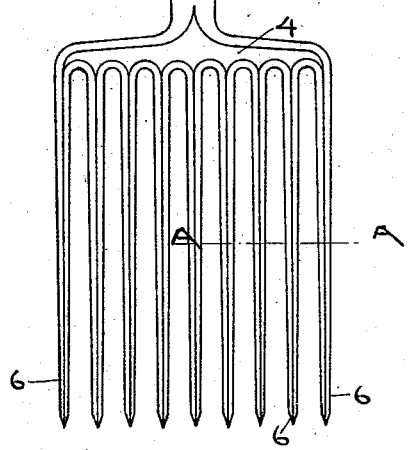
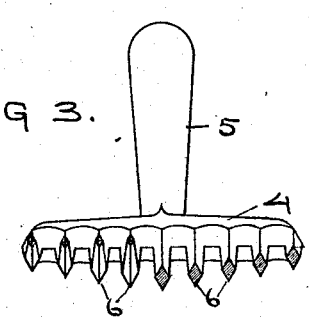
WITNESSES
INVENTOR

UNITED STATES PATENT OFFICE.

THEOLINDA B. SORENSON, OF CHICAGO, ILLINOIS.

COMBINED COAL-SHOVEL AND ASH-SIFTER.

SPECIFICATION forming part of Letters Patent No. 571,205, dated November 10, 1896.

Application filed November 21, 1894. Serial No. 529,511. (No model.)

*To all whom it may concern:*

Be it known that I, THEOLINDA B. SORENSON, a citizen of the United States, residing at Chicago, in the county of Cook and State of Illinois, have invented a new and useful Combined Coal-Shovel and Ash-Sifter, of which the following is a specification.

The object of this invention is to provide a combined coal-shovel and ash-sifter of simple construction and novel arrangement.

With this object in view the invention consists in the novel construction, combination, arrangement, and relative location of parts, all as will be more fully hereinafter set forth, as shown in the accompanying drawings, and finally pointed out in the appended claim.

Figure 1 is a plan view of a coal-shovel and ash-sifter combined and constructed in accordance with the principles of my invention. Fig. 2 is a side elevation of the same. Fig. 3 is an end view, partly in section, on the line A A, Fig. 1.

In carrying out my invention I provide a suitable body 4, having a handle 5 formed on or secured thereto in any suitable way. Secured to the body portion or, and preferably, formed or cast therewith are a series of tines or fingers 6, arranged to project therefrom. The tines or fingers are preferably and as drawn curved or bent in the direction of their length from the body portion outward, the curve or bent portion forming an offset or depression from the plane of the body portion and the outer extremity thereof, the depression being greatest midway the length of the tine, and, as shown, the intermediate tines or fingers are given a greater degree of curvature than the outer ones, the curvature or bend of the grate-surface thus increasing from the extreme outer tine or finger inwardly to the center one, thus forming a spoon-shaped shovel. The tines are also constructed tapering from the point where they join the body portion outward to the ends thereof, as shown. By the construction above described the shovel can be easily and with facility inserted in a pile of ashes with no or almost imperceptible disturbance of same.

In order to provide a suitable grate-surface adapted to effect a sifting of the ashes, I construct the tines or fingers 6 of angular shape in cross-section, and by "angular shape" I desire to be understood as either oval or cylindrical or any other suitable or desirable shape in cross-section. However, in practice, and as shown in Fig. 3, the specific form, namely, a diamond shape in cross-section is preferred, for thereby the fingers or tines present sharp edges and inclined or declined sides to the body of the ashes when the shovel is inserted, and hence a sifting of the ashes is more rapidly and effectively accomplished than would otherwise be possible, it being understood that the point or edge of the angularly or oval shaped tines is presented.

From the construction above set forth it will be seen that a sifting of the ashes can be quickly and thoroughly effected and the unburned particles of coal collected and recovered without disturbing or removal of the ashes on or from the grate, stove, or oven, thus avoiding the annoyance and inconvenience usually attending the sifting of ashes.

The combined sifter and shovel is exceedingly simple in construction, can be easily and cheaply manufactured, and is thorough and proficient in the performance of the work required of it.

I do not desire to be restricted to the exact details of construction and arrangement shown, as many variations and changes would readily suggest themselves to any skilled mechanic and still fall within the spirit or scope of my invention; but,

Having now fully described my invention, its purpose and mode of operation, what I claim as new, and desire to secure by Letters Patent of the United States, is—

In a combined coal-shovel and ash-sifter, a handle, a body portion formed integrally therewith, a series of tapering tines, rectangular in cross-section, formed integrally with said body portion and projecting therefrom in a slight curve relative to the direction of length of said handle, said tines presenting their sharp corners or edges as an upper surface, and also bent longitudinally, the bends of the respective tines increasing from the outer tines inwardly and the ends of the tines being arranged in a straight line with each other, thereby forming a scoop; as and for the purpose set forth.

In witness whereof I have hereunto set my hand this 19th day of November, 1894.

THEA. B. SORENSON.

Witnesses:
H. B. SORENSON,
WM. WICKMANN.